US007421074B2

(12) United States Patent
Jin et al.

(10) Patent No.: US 7,421,074 B2
(45) Date of Patent: Sep. 2, 2008

(54) SECURITY SYSTEM USING RSA ALGORITHM AND METHOD THEREOF

(75) Inventors: Weon-il Jin, Suwon-si (KR); Mi-suk Huh, Suwon-si (KR); Bae-eun Jung, Seongnam-si (KR); Bum-jin Im, Suwon-si (KR); Kyung-hee Lee, Yong-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 762 days.

(21) Appl. No.: 10/959,993

(22) Filed: Oct. 8, 2004

(65) Prior Publication Data

US 2005/0078821 A1 Apr. 14, 2005

(30) Foreign Application Priority Data

Oct. 9, 2003 (KR) .................... 10-2003-0070103

(51) Int. Cl.
*H04L 9/30* (2006.01)
(52) U.S. Cl. ........................ 380/30; 380/255
(58) Field of Classification Search .............. 380/30
See application file for complete search history.

(56) References Cited

U.S. PATENT DOCUMENTS

| 5,588,061 A | * | 12/1996 | Ganesan et al. | ............... 380/30 |
| 5,768,389 A | * | 6/1998 | Ishii | ............................ 380/30 |
| 6,666,381 B1 | * | 12/2003 | Kaminaga et al. | ........... 235/492 |
| 6,731,755 B1 | * | 5/2004 | Cocks | ......................... 380/30 |
| 6,986,054 B2 | * | 1/2006 | Kaminaga et al. | ........... 713/193 |
| 7,058,808 B1 | * | 6/2006 | Zolotorev et al. | ........... 713/176 |
| 7,254,718 B2 | * | 8/2007 | Kaminaga et al. | ........... 713/194 |

OTHER PUBLICATIONS

Gene Tsudik, "Weak Forward Security in Mediated RSA", Department of Information and Computer Science, University of California, Irvine, (MRSA Sep. 2002) (11 pages).
Official Action issued by the Korean Intellectual Property Office on Sep. 23, 2005 in Korean Patent Application No. 2003-70103.

* cited by examiner

*Primary Examiner*—Matthew B Smithers
(74) *Attorney, Agent, or Firm*—Staas & Halsey LLP

(57) ABSTRACT

A security system using an RSA algorithm that includes a key input section for receiving a secret key and a public key used in one of encryption and decryption of a message, a random coefficient generating section for generating a random coefficient r having a bit of a predetermined size, a first calculation section for dividing the secret key into a first secret key and a second secret key by using the value of r, and performing an exponentiation of RSA algorithm by using the respective secret keys and the public key, and a second calculation section for performing one of the encryption and the decryption by combining results of exponentiation calculated respectively by using the first and the second secret keys.

18 Claims, 5 Drawing Sheets

SECURITY SYSTEM USING RSA ALGORITHM AND METHOD THEREOF

CROSS-REFERENCE TO RELATED APPLICATION

This application claims the benefit of Korean Patent Application No. 2003-70103 filed Oct. 9, 2003, in the Korean Intellectual Property Office, the disclosure of which is incorporated herein by reference.

BACKGROUND OF THE INVENTION

1. Field of the Invention

The invention relates to a security system using a Rivest-Shamir-Alderman (RSA) algorithm and a method thereof, and more particularly, to a security system for preventing attacks to Distributed Password Authentication (DPA) by establishing a random coefficient in the execution of the RSA algorithm, and a method thereof.

2. Description of the Related Art

Technology relating to security systems for computers and Internet networks is important with respect to electronic communication, such as e-mail service, electronic trade, and wireless communication. However, to ensure the security of electronic communication, an information safe service, such as a secrecy and a digital signature of a message to be sent, a personal identification, an electronic notarization, and an electronic tender, should be provided.

Current smart cards, which are presently the most secure type of technology, are very susceptible of being hacked. Such hacking of smart cards compromises the security of personal information by the extraction of personal credit information stored in the smart card and the electronic signature generating key, the forgery and the alteration of the certificate of the person himself and the electronic money based on the I.C chip, and other such abuses of personal information. Therefore, a cipher processing of the communication data in the security system of the smart card is necessary. An RSA algorithm is currently recognized as the best public-key cryptography technology.

The RSA (R. L. Rivest, A. Shamir, L. M. Aldmeman) is a cryptography and decipher algorithm using a public key, which the public can know, and a secret key, which a person himself/herself can know, which are utilized in the cryptography that is similar with general public key cryptography.

RSA security is based on that the assumption that the greater a number is the more difficult the factorization of a coprime factor using that number becomes. In other words, a user sending a message designates prime numbers p and q to secret keys and opens the value of n=p*q as the public key to the public. For safety reasons p and q preferably have a length greater than 512 bits, respectively, or a similar length thereto. The user then designates any number e having a relatively prime relationship with a value of Euler quotient function $\phi(n)=(p-1)(q-1)$, and opens d satisfying the equation $e \cdot d=1$ mod $\phi(n)$ as the secret key.

When a user1, who wishes to transmit a predetermined message, inputs the predetermined message, a binary number corresponding to the input message is written as a predetermined cryptogram through a binary secret key. This is able to be expressed by an equation $C=M^d$ mod N. A user2 then receives the cryptogram and opens the message. The receiver message is able to be expressed by an equation $M=C^e$ mod N. "M" is a variable referring to the message, "d" is a variable referring to the secret key, and "e" and "N" are variables referring to the public keys. The user1 writes a predetermined cryptogram by using the public key and the user2 deciphers the cryptogram by using his/her own secret key.

The exponentiation equation described above is also applied to the electronic signature. Namely, in order to send a digital signature in the message to be sent, a sender sends a signature sentence S and the message M generated through the process $S=M^d$ mod n to a receiver, and the receiver certificates the signature as real when the received M and the calculated M' are identical each other by comparing both M and M' after decoding through the process $M'=S^e$ mod n.

In this cryptography, although the power residue multiplication $X^Y$ mod N with the cryptography and the decipherment is used, this is able to be reduced to two forms of residue multiplications, $A^2$ mod N and AB mod N. Therefore, when d(i)=0, watching values d(i) of d=d(n), d(n-1) ... d(0) from the upper most d(n) to the lowest d(0) by one (1) bit sequentially, only $A^2$ mod N is calculated, and when d(i)=1, $A^2$ mod N and AB mod N are calculated. Thus, when d(i)=0, the determination whether i=0 or not is performed after the calculation of $A^2$ mod N, if d(i)=1, then the determination whether i=0 or not is performed after the calculation of $A^2$ mod N and AB mod N, so that two current waveforms corresponding to $e_i$=0 and 1 are represented.

Figure 1:
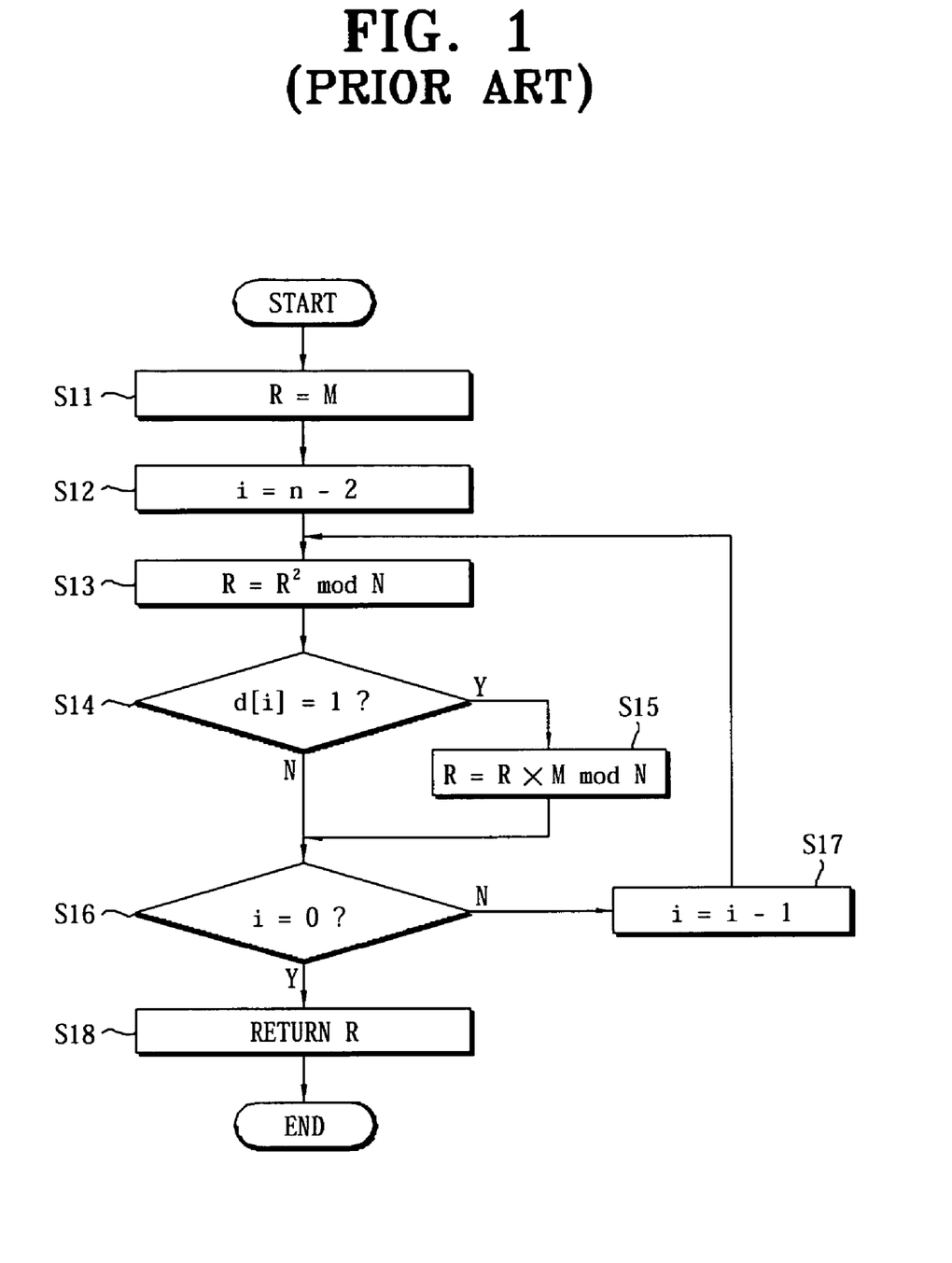
FIG. 1 is a flowchart illustrating an exponentiation from an uppermost bit to a lowest bit in a conventional RSA algorithm.
Figure 2:
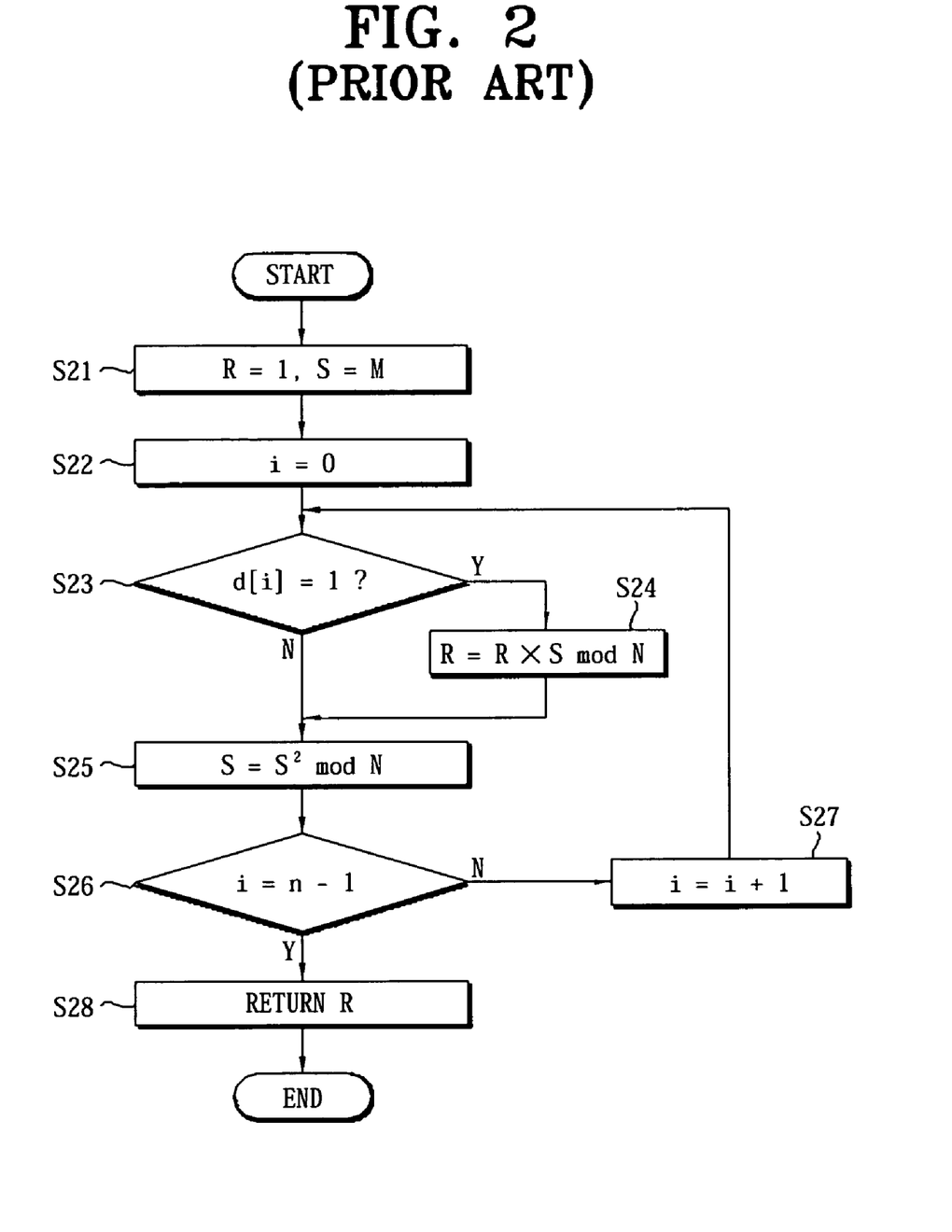
FIG. 2 is s flowchart illustrating an exponentiation from a lowest bit to an uppermost bit in a conventional RSA algorithm.

FIGS. 1 and 2 are flowcharts illustrating the RSA algorithm in more detail, more especially illustrating the cryptography using the secret key from the RSA algorithm. FIG. 1 illustrates a method of calculating, as described above, from an upper bit to a lower bit, and FIG. 2 illustrates a method of calculating from the lower bit to the upper bit.

As shown in FIG. 1, when the user1 inputs a message, a binary number M corresponding to the message is inputted as a variable R (operation S11). For example, when a bit number of the secret key d is 1024 bits, since the bit number exists from 0 bit to 1023 bit and the upper most bit (1023rd bit) is '1' as matter of course, the bit number should be started from the next bit. Namely, the bit value of 1022nd corresponding to i=n-2 (operation 12). Here, "i" indicates a bit order of the secret key "d", and "n" indicates a bit number of the public key N.

Next, the exponentiation for $R=R^2$ mod N is executed by using the value of the initial R (operation 13). In operation 13, it is determined whether the i-th bit value of the secret key d is '1' when the i-th bit value is '1', after the value of M is multiplied to R obtained from $R=R^2$ mod N and divided by N again, the remainder of the calculation is determined as new value of R (operation 15).

When the i-th bit value of d is not '1', then it is again determined whether the calculation is performed to i=0, that is, the lowest bit is determined again (operation 16), and when the value is not '0', the value of i is reduced by one and the exponentiation is executed again (operations 17 and 13). When the lowest bit is determined to be 0 (operation 16), the obtained value of R is determined as the cryptography C (operation 18).

FIG. 2 is a flowchart illustrating the performance of the exponentiation from the lowest bit of the secret key d to the uppermost bit. In comparison with the algorithm shown in FIG. 1, the calculation is performed from i=0 (operation 22) by increasing the value of i-th bit by one (1) bit to the uppermost bit (i=n-1).

In other words, the cryptography M is set to the value of S, and R is set to arbitrary '1' (operation 21), then since the initial value is i=0 (operation 22), whether d(0)=1 or not is determined (operation 23). Namely, if the value of zeroth bit value of the secret key d is zero, the value of R is set to R*S mod N (operation 24), and S is calculated by the exponentiation with an equation $S^2$ mod N (operation 25). If d(0)=0, the value of R is not changed and is directly calculated by the equation $S=S^2$ mod N (operation 25).

After determining whether the value of i is reached to the uppermost bit (operation 26), if not reached, the value of i is increased by '1' (operation 27), the exponentiation is executed again, and if reached to the uppermost bit, the value of R at this time is set to the cryptography (operation 28).

Meanwhile, although the security of the smart card is approved as a safe zone for hacking by the RSA algorithm, the smart card is not approved as a method to challenge a side channel attack that is different from the conventional hacking method.

In general, four types of attacks, such as decap, timing, DPA, and fault insertion, can be included in the side channel attack. The decap is a method of soaking IC chip of the smart card into nitric acid solution in order of finding out circuit drawn on a surface thereof and obtaining principal data by inputting various kind of electric signals into the discovered circuit. The timing attack is a method of finding out the secret key by analyzing the difference between time required for the cryptography algorithm of the IC chip to process information that related to the secret key and time required for the cryptography algorithm to process data that is not related to the secret key. The fault insertion is a method of finding out the secret key in a manner that intentionally inputs wrong information into the IC chip and then analyzes the response data from the IC chip.

The DPA attack is regarded as the most threatening method among the side channel attacks, as well as a method of comparing and analyzing power consumption of the IC chip and when to process data that is related to the secret key and power consumption of the IC chip and when to process data that is not related to the secret key. Namely, the DPA attack originates from the view that the power consumption of CMOS transistor relates to phase transition and hamming weight (number of non-zero bit), therefore the waveform of the power consumption is measured in order to gather statistics while changing the message M by applying an encryption key in the exponentiation ($C=M^d$ mod N) of the RSA algorithm. In other words, when the calculation of intermediate result obtained by substituting the value to the RSA algorithm is repeated while changing the encryption key with various values, since a peak with a large current waveform is shown when a correct key is substituted, the secret key is able to be determined by analyzing the waveform of this power consumption and performing a statistical analysis.

Conventionally, to defend against the DPA attack, several methods are used, such as increasing the generation capacity by pairs in order to generate logic data as described in U.S. Pat. No. 6,510,518. In addition, the algorithm is able to be modified to make the prediction for the intermediate data, as described in U.S. Pat. No. 5,991,415.

According to the technology described in U.S. Pat. No. 6,510,518, the hamming weight is modified to have two states, '0' and '1' simultaneously in order, so that the hamming weight is not separated. In this case, the processing burden is increased approximately twice.

According to a method of varying the order of the algorithm and input value by modifying the algorithm proposed in U.S. Pat. No. 6,298,135, since the calculation from the uppermost bit to the lowest bit and the calculation from the lowest bit to the uppermost bit are performed simultaneously or in a mixed state, the calculation speed is lowered, and since the latter half of the calculation is always identical, an attacker is able to predict the algorithm more accurately.

Additional aspects and/or advantages of the invention will be set forth in part in the description which follows and, in part, will be obvious from the description, or may be learned by practice of the invention.

SUMMARY OF THE INVENTION

An aspect of the invention is to solve at least the above-identified problems and/or disadvantages and to provide at least the advantages described hereinafter. Another aspect of the invention is to provide a security system for enabling the prediction by performing encryption and decryption by arbitrary generating random coefficient and using the generated coefficient when DPA attack is tried and a method thereof.

To achieve the above aspects and/or other features of the invention, there is provided a security system including a key input section for receiving a secret key and a public key used in one of encryption and decryption of a message, a random coefficient generating section for generating a random coefficient r having a bit of a predetermined size, a first calculation section for dividing the secret key into a first secret key and a second secret key by using the value of r, and performing an exponentiation of RSA algorithm by using the respective keys and the public key, and a second calculation section for performing one the encryption and 10 the decryption by combining results of exponentiation calculated respectively by using the first and the second secret keys.

According to an aspect of the invention, the system further includes a message input section for receiving the message from exterior, converting the received message into a binary value corresponding to the received message, and outputting the binary value to the first calculation section, and an output section for outputting one of an encryption sentence and a decryption sentence corresponding to a result of calculation from the second calculation section.

According to another aspect of the invention, the first calculation section is able to divide the secret key by using a value subtracted the value of the random coefficient for the secret key and the value of the random coefficient as the first secret key and the second secret key, respectively, or divide the secret key into left side and a right side on the basis of the value of the random coefficient and use the divided values as the first secret key and the second secret key, respectively.

According to an aspect of the invention, in a case of subtraction, a final encryption and decryption is able to be performed by applying the result of the exponentiation calculated from the second secret key to the result of the exponentiation calculated from the first secret key.

According to an aspect of the invention, in a case of dividing the value of the random coefficient into the left side and the right side, the final encryption and decryption is able to be performed by adjusting decimal point of the first secret key and the second secret key, and performing the exponentiation with a predetermined equation corresponding to a value of bit in a position corresponding to the respective secret key.

According to an aspect of the invention, the security method using RSA algorithm in the security system includes receiving a secret key and a public key used in one of encryption and decryption of a message, generating a random coefficient value having a bit of a predetermined size, dividing the secret key into a first secret key and a second secret key by using the random coefficient value, and performing an exponentiation of RSA algorithm by using the respective keys and the public key, and performing one the encryption and the decryption by combining results of exponentiation calculated respectively by using the first and the second secret keys.

According to an aspect of the invention, the method further includes the receiving the message from exterior, converting the received message into a binary value corresponding to the received message, and outputting the binary value to the first calculation section; and outputting one of an encryption sentence and a decryption sentence corresponding to a result of calculation from the second calculation section.

According to an aspect of the invention, the dividing the secret key into a first secret key and a second secret key by using the random coefficient value, and performing an exponentiation of RSA algorithm by using the respective keys and the public key further includes dividing the secret key by using a value subtracted the value of the random coefficient for the secret key and the value of the random coefficient as the first secret key and the second secret key, respectively, or dividing the secret key into left side and a right side on the basis of the value of the random coefficient and use the divided values as the first secret key and the second secret key, respectively.

According to an aspect of the invention, In a case of dividing the value of the random coefficient into the left side and the right side, when performing one the encryption and the decryption by combining results of exponentiation calculated respectively by using the first and the second secret keys, the final encryption and decryption is able to be performed by adjusting decimal point of the first secret key and the second secret key, and performing the exponentiation with a predetermined equation corresponding to a value of bit in a position corresponding to the respective secret key

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 3:
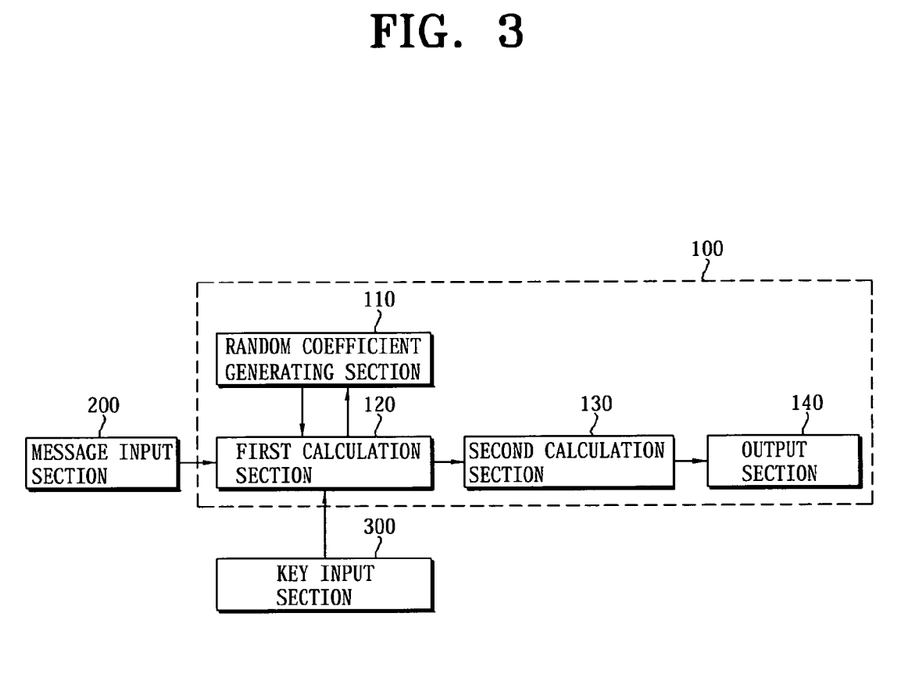
FIG. 3 is a view illustrating a RSA algorithm encryption apparatus by way of precaution against differential power analysis attack according to an aspect of the invention.

FIG. 3 is a block diagram illustrating the construction of a security system according to an aspect of the invention. As shown in FIG. 3, the security system includes a message input section 200, a key input section 300, and a control section 100. The control section 100 includes a random coefficient generating section 110, a first calculation section 120, a second calculation section 130, and a output section 140.

As described above, in the RSA algorithm, there are two encryption methods, a first method of transmitting a message by using a secret key and checking the message by using a public key, and a second method of transmitting a message by using a public key and checking the message by using a secret key. Since the calculations of the first and second encryption methods are directly opposite to the calculation equation but same in the calculation manner and the order thereof, the following description is limited to a case of encryption by using the secret key.

The message input section 200 receives a message to be transmitted and outputs the message after converting the received message into a corresponding binary value to the control section 100. As such, when a user inputs a predetermined character, the message input section 200 converts the input character into a digital code corresponding to the input character. Hereinafter, the converted message is indicated to M.

The key input section 300 receives the public key and the secret key necessary for the encryption and the decryption. As described above, the RSA algorithm is an algorithm that ciphers the message through the exponentiation equation $C=M^d$ mod N by using the public key and the secret key, and deciphers the encryption through an equation $M=C^e$ mod N. In this case, the secret key "d" and the public key "e", and "N" are directly inputted by an user wishing to transmit the message. The key input section 300 receives the secret key and the public key and outputs the received secret key and the public key to the control section 100 after converting the received secret key and the public key into corresponding digital codes, so that the control section 100 performs the RSA algorithm.

The operation of the control section 100 will now be described. When the encryption through the RSA algorithm begins, the random coefficient generating section 110 generates and outputs an arbitrary coefficient "r" to the first calculation section 120. At that time, the bit size of "r" is set as an arbitrary value, when the bit size of "r" is increased, the calculation amount is increased and the security is increased, and when the bit size of "r" is lowered, the calculation amount is decreased and the security is decreased. Thus, the proper bit size of "r" is set through experimentation. The security is able to be maintained sufficiently when the "r" is generated to be less than approximately $2^{32}$.

The first calculation section 120 divides the secret key into the first secret key and the second secret key by using the random coefficient r, and performs the exponentiation of the divided first and second secret keys and the inputted public key.

The second calculation section 130 extracts the result of the exponentiation by the secret key "d" by using the result of the exponentiation respectively calculated by the first and second secret keys. For example, the second calculation section 130 performs a correction to make the result of the calculation using the first and second secret keys the same as the result of the encryption and the decryption using the secret key "d" by dividing the secret key into the first and second secret keys.

The first calculation section 120 and the second calculation 130 operate together such that a value of d−r, i.e., subtracting the random coefficient r from the secret key d, is set as the first secret key, and the random coefficient r is set to the second secret key. A final cryptography is able to then be written by performing the exponentiations for the respective secret keys and correcting thereof.

Figure 4:
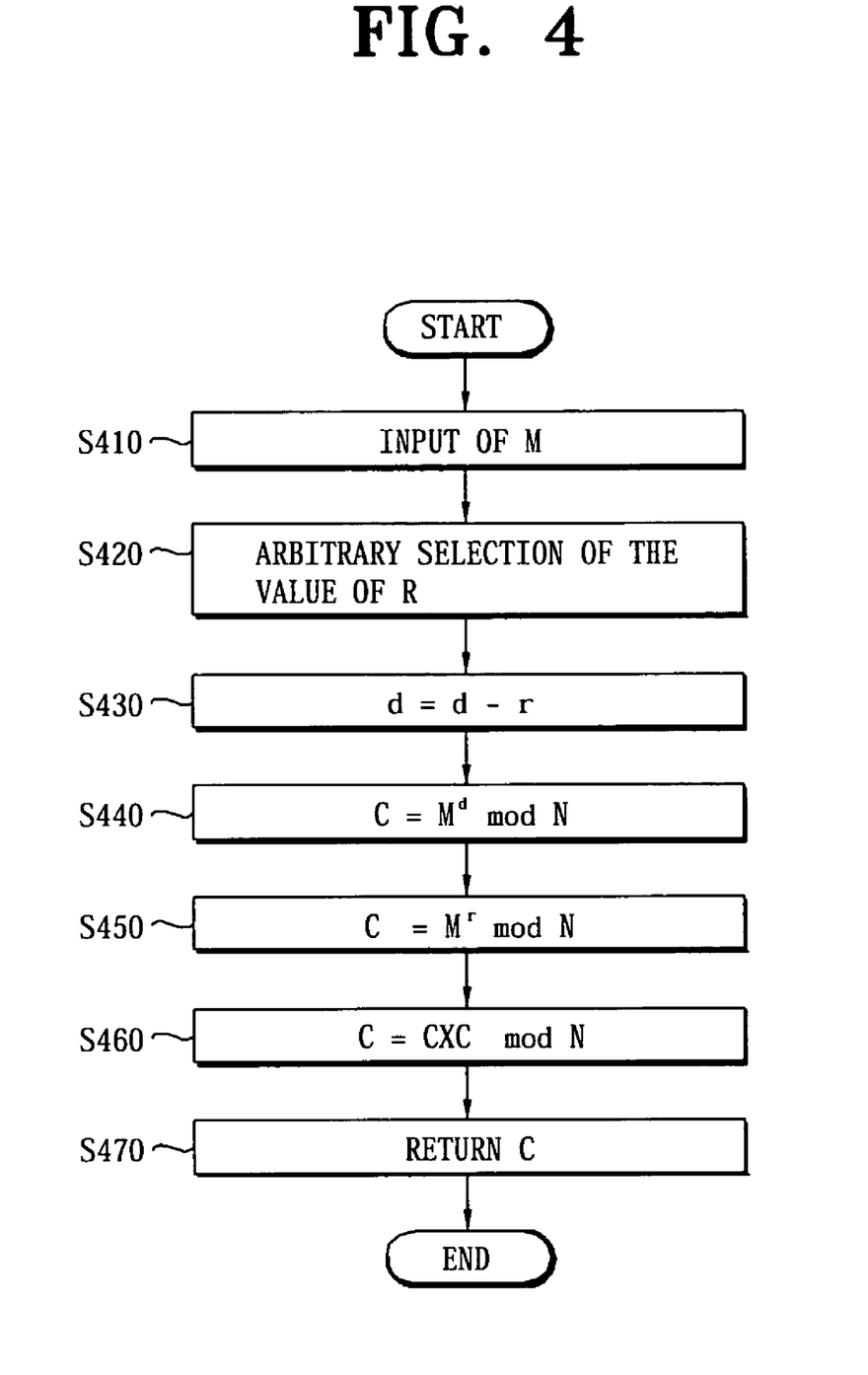
FIG. 4 is a flowchart illustrating an embodiment of RSA algorithm intercepting the differential power analysis attack according to an aspect of the invention.

FIG. 4 is a flowchart illustrating the calculation functions described above. As shown in FIG. 4, when the user input the message M (operation 410), the random coefficient generating section 110 arbitrarily selects the value of "r" (operation 420). The first calculation section 120 newly sets the secret key to d−r by using the selected value of "r" (the newly set key is referred to the "first secret key") (operation 430), and performs the exponentiation by the new first secret key (operation 440).

In this case, the exponentiation equation is expressed as an equation $C=M^{d-r}$ mod N. The exponential calculation of the equation is able to be processed according to the flowchart shown in FIG. 2. Meanwhile, the random coefficient "r" is set as the second secret key, and the equation $C'=M^r$ mod N is calculated again (operation 450). The coefficients C and C' shown in the equations indicate the result calculated by the first secret key and the result calculated by the second secret key, respectively.

The second calculation section 130 extracts the final cryptography C by calculating C*C' mod N by using the result of $C=M^{d-r}$ mod N (first secret key) and the result of $C'=M^r$ mod N (second secret key) (operation 460). The calculation result of C*C' mod N equals the cryptography C, as is noted from the following equations:

$$(C*C') \bmod N = (M^{d-r} \bmod N) * (M^r \bmod N) \quad \text{[Equation 1]}$$
$$= \left(\frac{M^d}{M^r} * M^r\right) \bmod N$$
$$= M^d \bmod N = C$$

The final cryptography C is able to be obtained from this method.

Figure 5:
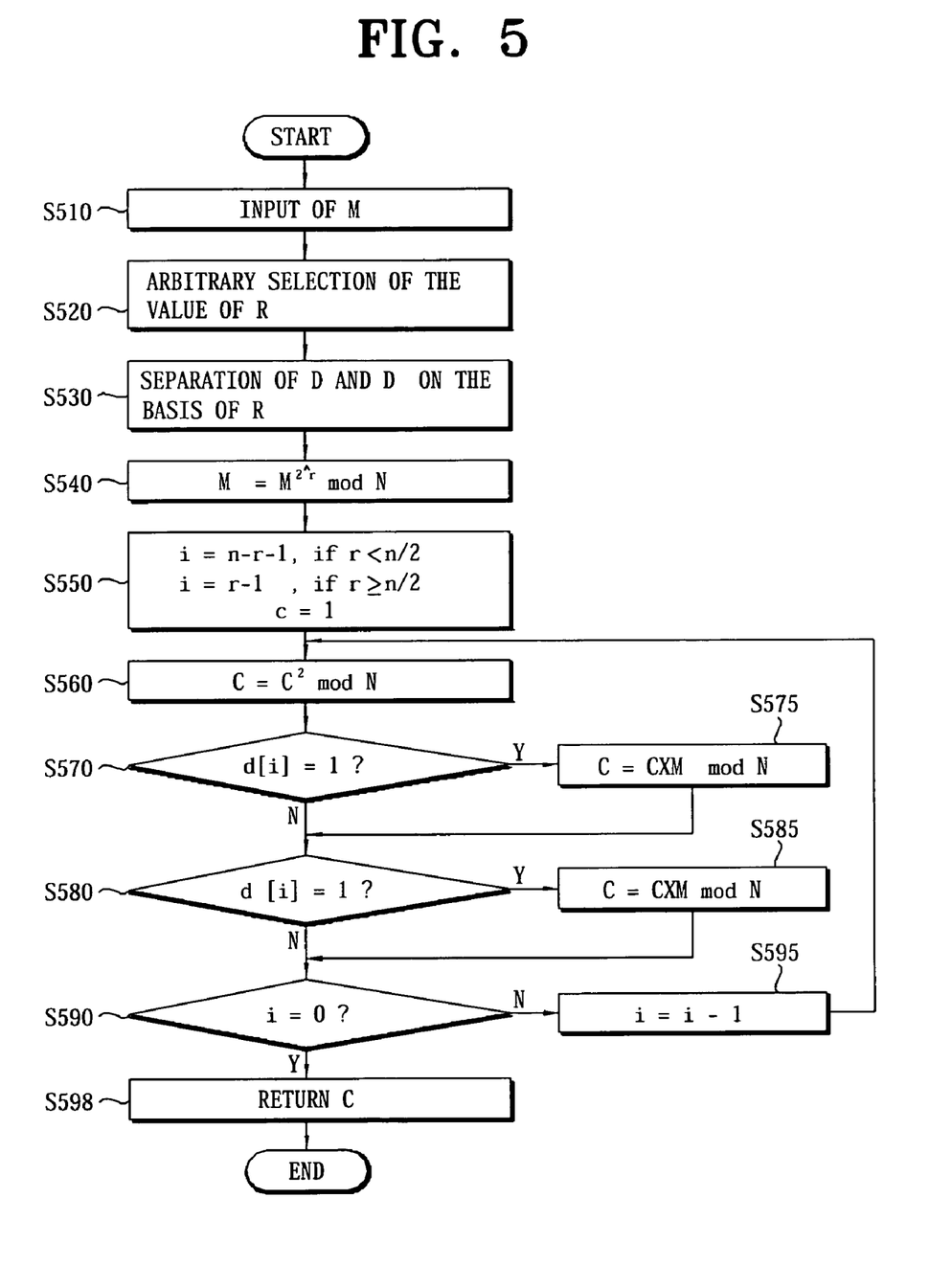
FIG. 5 is a flowchart illustrating another aspect of a RSA algorithm intercepting the differential power analysis attack according to an aspect of the invention.

In another aspect of the invention, the secret key d is able to be divided into a left side and a right side on the basis of the random coefficient. FIG. 5 illustrates this method. As shown in FIG. 5, when the user inputs the message M (operation 510), the value of the random coefficient "r" is arbitrarily selected (operation 520). In this case, the random coefficient with a bit size that is less than the bit size n of the public key "N" is selected.

The first calculation section 120 divides the random coefficient into d (the first secret key) and d' (the second secret key) on the basis of the value of "r" (operation 530). Namely, the first calculation section 120 stores a lower bit by the size corresponding to the bit size of "r" from original secret key d as the second secret key "d", and shifts the original secret key "d" bitwise right by "r" bits so that the first calculation section 120 stores the value subtracting "d" value therefrom as the first secret key "d".

Then, in order to match the bit sizes of the first and the second keys, the first calculation section 120 rises the message M to the r power, i.e., to M' (operation 540).

The bit size of each of the first and second secret keys is then adjusted (operation 550). Namely, when r is greater than n/2, the bit size of the second secret key is greater than that of the secret key, and the bit size is adjusted by changing the size of the upper 2r−n bit of the first secret key to '0' when r is less than n/2, the bit size of the first secret key is greater than that of the second secret key, and the size of the upper n−r bit of the second secret key is changed to '0'. Therefore, the initial value of i equals n−r−1 when r is less than n/2 and r−1 when r is greater than n/2.

The cryptography is then written by the exponentiation of the message M'. A double method using the equation $C=C^2$ mod N is used without the exponential shown in FIGS. 1 and 2. The double method is a method of performing procedure that when, after squaring the intermediate result, the i-th bit of the first secret key is '1', M' is multiplied to the intermediate result, and when the i-th bit of the second secret key is 1, M is multiplied to the intermediate result, repeatedly by a number corresponding to bit numbers of the first and second secret keys.

In other words, when the decimal points and the bit sizes of the first and second secret keys are adjusted, the calculation $C=C^2$ mod N is performed (operation 560) and whether the i-th bit of the first secret key is '1' is determined (operation 570). When the calculation $C=C^2$ mod N is first performed, the value of C is set to '1.'

When the i-th bit of the first secret key is '1', the calculation C*M' mod N is performed and the result value is again stored as C (operation 575). Then, whether the i-th bit of the second secret key is '1' is determined (operation 580), when the i-th of the second secret key is '1', the calculation C*M mod N is performed, and then the result of calculation is again stored as the value of C (operation 585).

When the value of i is determined to reach to the lowest bit (operation 590), the value of C is determined as the final cryptography (operation 598). When the value of I is not determined to reach to the lowest bit, the value of i is again reduced by '1', the value of C is the substituted into the equation $C^2$ mod N to determine the value of C (operation 560), and then the described procedure is repeated.

When the value of the i-th bit of the first and second secret keys is '1', the result of the previously calculated equation M*M' mod N, which is stored in a memory, is used; therefore the calculation is performed only once and the calculation time is able to be reduced by approximately 5%.

The output section 140 outputs the message in the form of the original message by converting the value of C i.e., digital code obtained from the second calculation section 130.

As illustrated in FIG. 3, although the random coefficient generating section 110, the first calculation section 120, the second calculation section 130, and the output section 140 are shown as respective separated units, the sections are realized by a separated chip or single microprocessor.

A security method using RSA algorithm according to an aspect of the invention is illustrated out by the flowcharts shown in FIGS. 4 and 5 and the description thereof.

The security method includes the receiving a secret key and a public key by the user, generating a random coefficient, dividing the secret key by using the random coefficient, and generating the final cryptography by performing the exponentiation for the respective divided secret keys and correcting the performance result.

Dividing the secret keys by using the random coefficient and generating the final cryptography from the respective secret keys is illustrated by the flowcharts shown in FIGS. 4 and 5. The descriptions of the first embodiment and the second embodiment are the same as described above.

In one aspect of the invention the value of d−r r is set as the first secret key and the random coefficient r itself is set to the second secret key, C and C' are calculated by performing the exponentiation for the respective value. Namely, when the value of the corresponding bit of the finally-obtained cryptography is set to $C_i$, $C_i$ is obtained from the equation C*C' mod N.

In another aspect of the invention, the lower bit corresponding to the bit size of r from the secret key d on the basis of the random coefficient r is set as the second secret key, and the original secret key d shifted bitwise right is set as the first secret key. After adjusting the bit numbers of the respective secret keys, the cryptography is extracted by the double method. Meanwhile, when storing the value of M*M' mod N calculated previously to the memory, the delay of the calculation speed is able to be reduced by using the stored value when all the corresponding bits of the first and second secret keys is '1'.

If the exponentiation is performed by using the value of the random coefficient r according to the first and second embodiments, a successful DPA attack is nearly impossible. Therefore, the electronic mail, the electronic signature, and the authentication are much more secure.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A security system comprising:
   a key input section for receiving a secret key and a public key used in encryption or decryption of a message;
   a random coefficient generating section for generating a random coefficient value having a predetermined bit size;
   a first calculation section for dividing the secret key into a first secret key and a second secret key by using the generated random coefficient value, and performing an exponentiation of an RSA algorithm by using the respective first and second secret keys and the public key; and
   a second calculation section for performing the encryption or the decryption by combining the results of the exponentiation calculated by using the first and second secret keys, respectively,
   wherein the first calculation sets a lower bit of the secret key corresponding to the bit size of the random coefficient as the second secret key, and a value of shifting bitwise right the secret key by the bit size of the random coefficient as the first secret key.

2. The security system as claimed in claim 1, further comprising:
   a message input section for receiving the message, converting the received message into a binary value corresponding to the received message, and outputting the binary value to the first calculation section; and
   an output section for outputting the encryption message or the decryption message from the second calculation section.

3. The security system as claimed in claim 1, wherein the first calculation section uses a value equal to the secret key minus the random coefficient as the first secret key and the value of the random coefficient as the second secret key.

4. The security system as claimed in claim 3, wherein the first calculation section performs the exponentiation of the RSA algorithm by using following equations, $C = M_d \bmod N$, $M = C_e \bmod N$, when the secret key is used for ciphering, or $C = M_e \bmod N$, $M = C_d \bmod N$, when the public key is used for ciphering, wherein C is a cryptography variable, M is a message variable, d is a secret key variable, and e and N are each public keys variables.

5. The security system as claimed in claim 4, wherein the second calculation section performs the encryption or the decryption by using one of the following equations, $C_i = C * C' \bmod N$, in a case of the encryption, and $M_i = M * M' \bmod N$, in a case of the decryption, wherein $C_i$ is a final cryptography variable, $M_i$ a final message deciphered variable, C and M are each the results of exponentiation using the first secret key respectively, and C' and M' are the results of exponentiation using the second secret key, respectively.

6. The system as claimed in claim 1, wherein the first calculation section converts the message by using the following equation in order to match the bit sizes of the first secret key and the second secret key, $M' = M^{2^r} \bmod N$, wherein M is a message variable, r is a random coefficient variable, N is a public key variable, and M' is a converted message variable.

7. The security system as claimed in claim 6, wherein the first calculation section performs the exponentiation of the RSA algorithm by using one of the following equations, $C = C^2 \bmod N$, in a case of encryption, or $M = M^2 \bmod N$, in a case of decryption, wherein C is a cryptography variable, M is the message variable, and N is a public key variable.

8. The security system as claimed in claim 7, wherein the second calculation section calculates the equation $C*M' \bmod N$ to store the result of the calculation as the value of C when the value of i-th bit of the first secret key is '1', and substitutes the value of C into the equation $C*M' \bmod N$ to store the obtained result from the calculation as a final value of the i-th bit when the value of i-th bit of the second secret key is '1'.

9. The system as claimed in claim 8, wherein the second calculation section calculates M*M' or C*C' to store the result of calculation, and substitutes the M*M' or the C*C' into the following equation to perform the encryption the decryption, when all the values of the i-th bits of the first secret key and the second secret key is '1', $C_i = C*M*M' \bmod N$, $M_i = M*C*C' \bmod N$, wherein $C_i$, is a final cryptography variable, M is the message variable, M' is the result of the equation $M^{2^r} \bmod N$.

10. A security method using an RSA algorithm, comprising:
   receiving a secret key and a public key used in encryption or decryption of a message;
   generating a random coefficient having a predetermined bit size;
   dividing the secret key into a first secret key and a second secret key by using the generated random coefficient and performing an exponentiation of the RSA algorithm by using the respective first and second keys and the public key;
   performing the encryption or the decryption by combining results of exponentiation calculated respectively by using the first and second secret keys;
   setting a lower bit of the secret key corresponding to the bit size of the random coefficient as the second secret key; and
   setting the value of shifting bitwise right the secret key by the bit size of the random coefficient as the first secret key.

11. The security method as claimed in claim 10, further comprising:

receiving the message, converting the received message into a binary value corresponding to the received message, and outputting the binary value; and outputting one of an encryption message and a decryption message corresponding to the result of calculation.

12. The security method as claimed in claim 10, further comprising:

subtracting the generated random coefficient from the secret key and using the result as the first secret key;

using the value of the generated random coefficient as the second secret key.

13. The security method as claimed in claim 12, wherein the performing the exponentiation of the RSA algorithm is performed by using one of the following equations, $C=M^d \bmod N, M=C^e \bmod N$, when ciphering is performed using the secret key, or $C=M^e \bmod N, M=C^d \bmod N$, when ciphering is performed using the public key, wherein C is a cryptography variable, M is a message variable, d is a secret key variable, and e and N are each public key variables.

14. The security method as claimed in claim 13, wherein the performing the encryption or the decryption is performed by using one of the following equations, $C_i = C*C' \bmod N$, or $M_i = M*M' \bmod N$, wherein $C_i$ is a final cryptography variable, $M_i$ is a final message deciphered variable, C and M are each the result of exponentiation using the first secret key, and C' and M' are each the result of exponentiation using the second secret key.

15. The security method as claimed in claim 10, further comprising:

converting the message by using the following equation to match the-bit sizes of the first secret key and the second secret key: $M'=M^{2^{-r}} \bmod N$, wherein M is a message variable, r is a random coefficient variable, N is a public key variable, and M' is a converted message in order to adjust decimal points of the first secret key and the second secret key divided on the basis of the value of the generated random coefficient.

16. The security method as claimed in claim 15, wherein the exponentiation is performed by using one of the following equation, $C=C^2 \bmod N$, in a case of encryption, or $M=M^2 \bmod N$, in a case of decryption, wherein C is a cryptography variable, M is a message variable, and N is a public key variable.

17. The security method as claimed in claim 15, wherein the performing the encryption or decryption further comprises:

determining whether the value of i-th bit of the first secret key is '1';

calculating $C*M' \bmod N$ and storing the result of calculation as the value of C;

determining whether the value of i-th bit of the second secret key is '1';

substituting the value of C into $C*M \bmod N$ when the value of i is '1', and storing the obtained result the substitution as a final value of C;

determining whether i is '0'; and subtracting '1" and performing the exponentiation again when i is not '0'.

18. The security method as claimed in claim 16, further comprising:

calculating $M*M'$ and $C*C'$ and storing the result of calculation; and substituting one of $M*M'$ and $C*C'$ into the following equation to perform the encryption or the decryption, when all the values of the i-th bits of the first secret key and the second secret key are '1', $C_i = C*M*M' \bmod N, M_i = M*C*C' \bmod N$, wherein $C_i$, is a final cryptography variable, M is the message variable, M is the result of the equation $M^{2^{-r}} \bmod N$.

* * * * *